United States Patent [19]

Dauge et al.

[11] 4,285,413
[45] Aug. 25, 1981

[54] LOAD RECEIVER WITH BEAM HAVING ELASTIC FLECTION

[75] Inventors: Gilbert V. Dauge, Lagny; Jacques F. Langlais, Coudray Monteraux, both of France

[73] Assignee: Testut-Aequitas, Paris, France

[21] Appl. No.: 144,361

[22] Filed: Apr. 28, 1980

[30] Foreign Application Priority Data

May 7, 1979 [FR] France ................... 79 11457

[51] Int. Cl.³ .................. G01G 3/14; G01G 21/08
[52] U.S. Cl. ................... 177/210 C; 177/256
[58] Field of Search ............ 177/210 C, 256; 361/283, 287, 290

[56] References Cited

U.S. PATENT DOCUMENTS

| | | | |
|---|---|---|---|
| 2,968,031 | 1/1961 | Higa | 361/290 X |
| 4,191,268 | 3/1980 | Miyoshi et al. | 177/210 C |
| 4,237,989 | 12/1980 | Lewis | 177/210 C |
| 4,243,114 | 1/1981 | Brouwer | 177/210 C |

Primary Examiner—George H. Miller, Jr.
Attorney, Agent, or Firm—Dressler, Goldsmith, Shore, Sutker & Milnamow, Ltd.

[57] ABSTRACT

The invention relates to a load receiver comprising an upper plate 10 and lower plate 11, and a weighing mechanism located between them.

The weighing mechanism is made of two half-beams 12 and 13 supported on pieces 128 and 138 hinged on one side with respect to the upper plate 10 and on the other side with respect to the lower plate 11. Connected at their center by an elastic strip 14 having a constriction 140, these beams receive a flection related to the load. This flection is transferred by arms 15 and 16 to electrodes 151 and 161 forming a capacitor. By measuring the capacity of the capacitor, the weight of the load is obtained. The invention is of use notably for flat bathroom scales.

9 Claims, 6 Drawing Figures

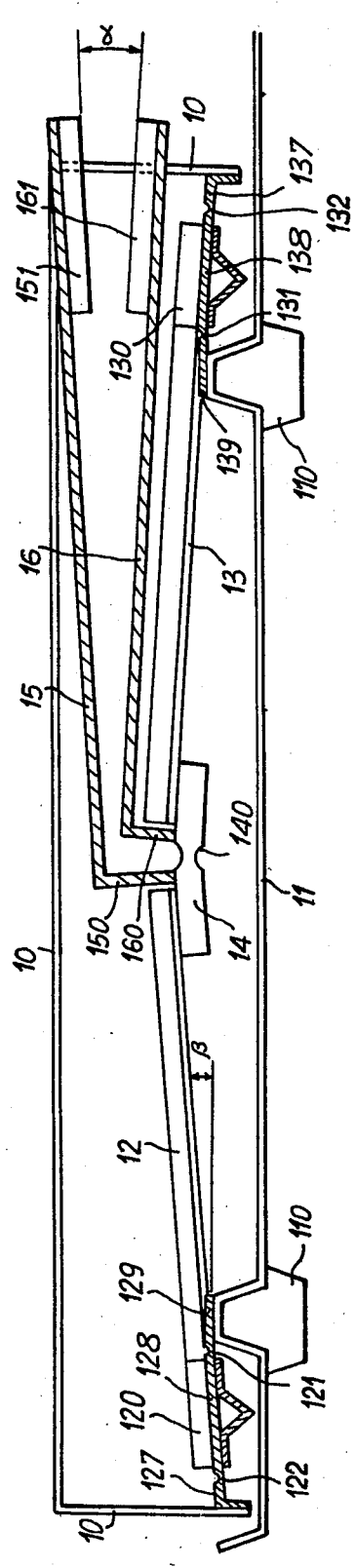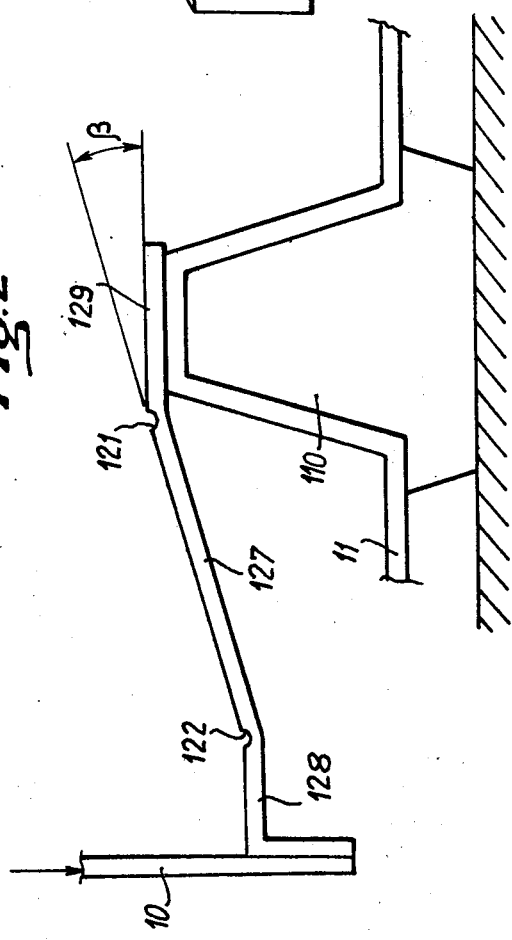

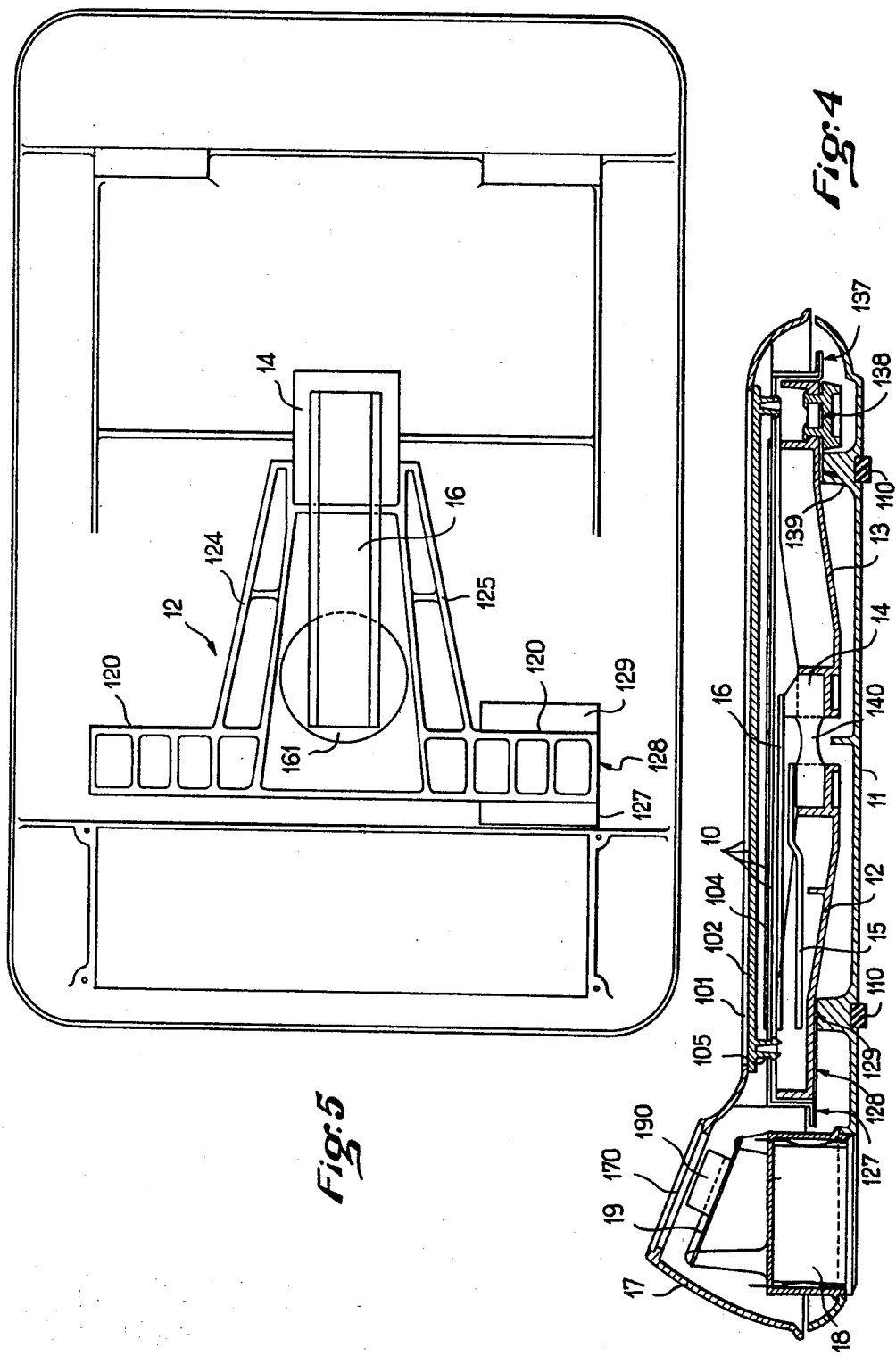

LOAD RECEIVER WITH BEAM HAVING ELASTIC FLECTION

This invention relates to weighing devices or small scales, and particularly, but not exclusively, to bathroom scales.

Weighing devices are already known which comprise an upper load-carrying plate, a lower bearing plate and a mechanism cooperating with these two plates in order to produce an indication relative to the load on the load-carrying plate, in which devices this mechanism comprises flection members and hinge means to transform the force due to a load on the load-carrying plate into two bending moments applied to the ends of the flection members.

An object of the present invention is to provide a load receiver which is flat, reliable as well as being simple and economical to produce.

For this purpose, according to the invention the hinge means are means forming two parallel double hinges, mounted at a distance from each other, each between the load-carrying plate and the bearing plate; the flection members comprise a bridge provided with an elastic central zone, the ends of which are connected respectively to the intermediate parts of the two double hinges; and finally the mechanism, also comprises two arms rigidly connected by one of their ends to the bridge one on each side of its central portion, as well as two capacitor plates supported by the said arms and capable of defining at least one capacity as a function of the load applied on the load-carrying plate.

The load-carrying plate and the bearing plate, the bridge and the two capacitor plate carrying arms are generally most advantageously parallel to each other.

In a preferred embodiment, the elastic central portion of the bridge comprises a constriction defining precisely the centre of rotation. The bridge preferably comprises a constrictional bending strip in the central portion and two levers arranged symmetrically with respect to the strip. Similarly, the two levers are advantageously generally T-shaped, arranged with their stems opposing each other, the bars of the T being rectangular pieces cooperating to define the joints, while their stems define a great transverse rigidity as well as a slight torsional rigidity.

According to another characteristic of the invention, the constriction of the elastic central portion is slightly displaced from the symmetrical position.

The double hinges, the load-carrying plate and the bridge are preferably generally symmetrical with respect to the elastic central portion of the latter.

In a particular embodiment, the means forming two double hinges comprise four elastic hinges each being defined by two parallel constrictions, mounted in the four corner zones of the upper plate and provided in pairs with axes of aligned hinges.

One of the plates of the capacitor advantageously projects slightly over the other plate along its entire periphery, the two plates together forming one capacitor.

In a variation, the two plates supported by the arms connected rigidly to the bridge on both sides of its central portion are the mobile plates of two variable capacitors, positioned so that the respective distance variations of the plates in the two capacitors under the action of the weighed load are of an opposite value.

Other characteristics and advantages of the invention will be disclosed when reading the detailed description which follows, illustrating a preferred embodiment of the present invention, with reference to the accompanying drawings.

FIG. 1 is a schematic sectional view of a preferred embodiment of the invention;

FIGS. 2 and 3 are details of the section of FIG. 1;

FIGS. 4 and 5 are two illustrations, respectively in section and a top view, of bathroom scales arranged according to a preferred embodiment of the invention.

Figure 6:
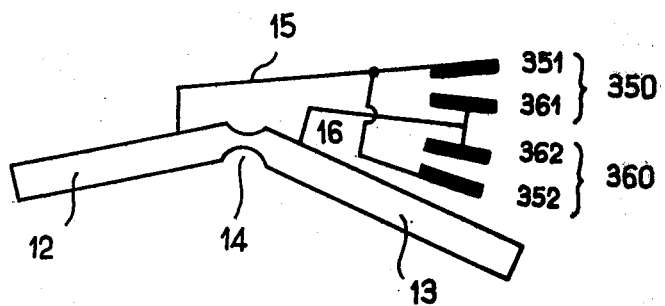
FIG. 6 is a schematic partial sectional view of a variation of the construction of the invention.

FIG. 1 shows an upper (load-carrying) plate 10 and a lower (bearing) plate 11, provided with four supporting feet 110. At the level of each of the supporting feet, an elastic double hinge joint connects the upper plate 10 to the lower plate 11.

As is shown by FIGS. 1 and 2, at the level of each of the two left supporting feet, the bearing plate 11 is integral with a fixed part 129 of the double hinge; this fixed part 129 is connected by means of a first rectilineal constriction 121 to an intermediate part 128 of the double hinge, which in turn is connected by means of a second rectilineal constriction 122, parallel to the first, to an end part 127 of the double hinge, which is integral with a vertical flange of the load-carrying plate 10. Although it is possible to provide one double hinge overlapping the two supporting feet 110 located on the left-hand side of FIG. 1, at the moment, it is considered preferably to provide two narrow double hinges, the one aligned with the other, at least as far as their constrictions are concerned, and being advantageously identical.

On the right-hand side of FIG. 1, there is a similar arrangement, including a double hinge comprising a fixed part 139 integral with the bearing plate 11 on the right of the foot 110, an intermediate part 138 and an end part 137 integral with the load-carrying plate 10.

According to the invention, a bridge is formed by two levers 12 and 13, joined by an elastic central portion 14, the elasticity of the latter being principally supplied by a constriction 140 (FIG. 3). The elements 12 and 13 are generally T-shaped with a double stem and the ends of their stems are opposite each other. The end transverse bars of the T's, designated respectively by reference numbers 120 and 130, are integral with the intermediate parts 128 and 138 of the double hinges. The ends of the elastic strip 14, shown in isometric projection in FIG. 3, are attached in the centre to the ends of the stems of these T's. The assembly is rigid and flection is practically only allowed at the level of the centre of the constriction 140 of the elastic strip 14. On both sides of this constriction, two elbows 150 and 160 are attached on to the elastic strip 14, forming part of the arms 15 and 16 which generally extend parallel to the plates 10 and 11, to be terminated by the plates 151 and 161 forming a capacitor between them.

The four double hinges (such as 127 to 129 and 137 to 139) are substantially positioned in order to form a rectangle and this rectangle is practically symmetrical with respect to the centre 140 of the elastic strip 14. Therefore, the loads applied on the upper plate 10 apply two respective bending moments to the two levers 12 and 13 (flection for lever 13), bearing in mind the fact that these are supported at a fixed point at 129 and 139 on the bearing plate; these bending moments are thus finally applied on the bending strip 14, which acquires a certain angle which is hardly visible in practice. The same angle is produced between the arms 15 and 16 and varies the spacing between the plates 151 and 161 of the capacitor. Thus, a capacity is finally obtained at the level of this capacitor, which capacity is related monotonically to the value of the load applied on the plate 10. This variation of capacity may be measured by various means known in the art. The capacity is advantageously measured according to French Patent Application No. 28,758, filed on Sept. 23, 1977 in the name of the Applicant.

One of the electrodes 151 and 161 is preferably slightly larger than the other, in order to prevent variations of capacity from occurring between the electrodes due to relative parasitic displacements.

It is important for the operation of the invention that the bridge which is formed here by the two levers 12 and 13 has a great transverse rigidity, i.e. that it transmits integrally the bending moment of weighing vertically to the bending strip 14; on the other hand, the same elements 12 and 13 preferably have a slight torsional rigidity in order to avoid applying torsional stresses to the bending strip 14 which would correspond to the variations in position which the load may have on the upper plate 10.

The deformations in FIGS. 1 and 2 have naturally been greatly exaggerated in order to show the operation more clearly.

On the diagram of FIGS. 1 and 2, showing the principle of operation the stems of the levers 12 and 13 have a T-structure, the head of which is oriented downwards. These stems themselves are part of a large T, the heads 120 and 130 of which are attached, for example by soldering, on to the pieces 128 and 138, abutments being arranged if necessary opposite the heads 120 and 130 with respect to the pieces 128 and 138.

FIGS. 4 and 5 illustrate a practical embodiment of the invention in the form of bathroom scales. The elements which are functionally equivalent to those of the diagram of principle in FIGS. 1 to 3 retain the same reference numbers and will not be described again, even if they have a different shape. In this respect, the structure and particular shape of the levers 12 and 13 which are generally similar will be particularly noted. The bending strip 14 is attached to the levers, one of the sides of the bending strip being raised in order to avoid using the elbows 150 and 160 of FIG. 1. The partial view of FIG. 5 clearly illustrates the moulded structure of the lever 12, the head of which conprises two elements which are in the form of a U-shaped beam pitted by linking elements, and of which the enlarged core extends between two borders 124 and 125 also shaped in the form of a pitted U-shaped beam. Finally, as is usual with bathroom scales, the upper composite plate 10 incorporates all the upper part of the apparatus, a protuberance 17 of which, comprising a transparent zone 170 allows the weight to be seen. The useful part of the load-carrying plate 10 comprises a moquette 101 resting on a plate 102 which itself rests on the plate 104 by means of longitudinal ribs (which are not shown). The plate 102 is attached to the plate 104 by hooks 105 and in turn rests on the end parts 127 and 137 of the elastic double hinges.

For their part, the arms 15 and 16, the direction of which is reversed with respect to FIG. 1, support the plates (unshown) of the capacitor. These are connected to an electronic circuit mounted on a printed circuit 19, and fitted with a display 190 visible through the transparency 170. The electronic device surmounts a cell compartment 18 which powers it, the assembly preferably being constructed according to the French Patent Application mentioned above.

Another characteristic of the invention will now be described with applies equally to all the embodiments.

It is appropriate to recall first of all that due to the slight torsional rigidity of the beam made of the elements 12, and 13, possibly of a single block, the weighing devices of the invention are slightly sensitive to the arrangement of the load in a perpendicular direction to the Figure. However, the fact remains that the indications which are finally obtained at the level of the capacitor may vary as a function of the position of the load along the plate 10 in the plane of the Figure. Thus, we have observed that the indication of the capacitor formed by the electrodes 151 and 161 is not strictly the same according to whether the load is placed in the centre or on the right-hand side or the left-hand side of the plate.

These phenomena cannot be explained easily. Schematically, an interpretation may be given by remarking that the instantaneous centre of rotation is defined by the intersection of the arms 15 and 16 connected to the capacitor. This centre of rotation is slightly displaced according to whether the load is positioned on the right-hand part or the left-hand part of the upper plate. More precisely, if the load is completely applied on the left part of the plate, the centre of rotation tends to be displaced towards the left. Conversely, if the load is positioned on the extreme right-hand part of the plate, the centre of rotation tends to be displaced towards the right. The results of this is that on one side, there is simultaneously an apparent modification of the geometry of the beam formed by the elements 12 and 13, and on the other side, a modification which is equally apparent of the length of the radii formed by the arms 15 and 16 with respect to the instantaneous centre of rotation. We have observed that these effects tend to initiate different errors according to whether the load is positioned on the right-hand part of the plate or on the left-hand part of the plate. We have also observed that it is possible to make these errors symmetrical as a function of the position of the load with respect to the centre of the plate, by slightly modifying the position of the centre of the constriction 140 of the bending blade with respect to the symmetrical centre of the rectangles defined by the axes of the double hinges. Therefore, according to another characteristic of the invention, the centre of the constriction 140 is slightly displaced from the theoretical symmetrical position and this from the side where the arms 15 and 16 are located. The amplitude of this displacement is determined experimentally from the displacement of the instantaneous centre of rotation observed when the load is displaced from the left end and from the right end of the plate. By designating this variation of the instantaneous centre of rotation as 2e, the displacement to be effected is expressed in a first approximation by the value $2e \times (L/Z)$, where L designates the distance between the centre of the constriction 140 and the first joint met by the beam, namely the joint 121 or 131 in the case of FIG. 1. For its part, Z designates the average value of the radius of rotation of the arms 15 and 16. With this arrangement according to the invention, when the load is positioned at a point other than in the centre of the plate, an error is obtained which is symmetrical with respect to the central position.

In the foregoing description, it was assumed that the two arms 15 and 16 respectively supported a mobile set of plates 151 and 161 and that these two plates were those of a single capacitor.

FIG. 6 shows a schematic and partial view of a variation where the arms 15 and 16 connected to the bending bar each carry two plates 351, 352, and 361, 362 respectively. The two plates 351 and 361 as well as the two plates 352 and 362 constitute two capacitors 350 and 360. It can been seen that the respective distance variations of the plates in these two capacitors under the action of the weighed load are of opposite value.

The present invention may naturally be modified by various variations. It will be particularly noted that, in the described embodiment, the joints of which the fixed point is connected to the lower plate are arranged inside with respect to the joints connected to the upper plate. The reverse arrangement is of course completely possible, with the observation that a result of this will be that there is an inversion of the bending angles obtained as a result of the load, as well as of the other connected parameters. The invention is not generally limited by the preferred embodiments given above, and embraces any variations which conform to its spirit.

We claim:

1. A weighing device comprising an upper load-carrying plate, a lower bearing plate, and a mechanism cooperating with these two plates to produce an indication relative to the load on the load-carrying plate, said mechanism comprising flection members and hinge means to transform the force due to a load on the load-carrying plate into two bending moments applied at the ends of the flection members, the hinge means comprising two parallel double hinges, mounted at a distance from each other, each being between the load-carrying plate and the bearing plate, the flection members comprising a rigid bridge provided with an elastic central zone, and of which the ends are respectively connected to the intermediate parts of the two double hinges, and the mechanism also comprising two arms respectively connected rigidly by one of their ends to the bridge on each side of its central part, and also two capacitor plates supported by the said arms and able to define at least one capacity as a function of the load applied on the load-carrying plate.

2. A weighing device according to claim 1, wherein the load-carrying plate and the bearing plate, the bridge and the two capacitor plate-carrying arms are generally parallel to each other.

3. A weighing device according to claim 1, wherein the means forming two double hinges comprise four elastic hinges each being defined by two parallel constrictions, mounted in the four corner zones of the upper plate, and provided in pairs with axes of aligned hinges.

4. A weighing device according to claim 1, wherein one of the plates of the capacitor slightly projects over the entire periphery of the other plate, the two plates together forming the same capacitor.

5. A weighing device according to claim 1, wherein the two capacitor plates carried by the arms which are rigidly connected to the bridge on both sides of its central part are the mobile plates of two variable capacitors, positioned so that the respective distance variations of the plates in these two capacitors under the action of the weighed load are of an opposite value.

6. A weighing device according to claim 1, wherein the elastic central part of the bridge comprises a constriction precisely defining the centre of rotation.

7. A weighing device according to claim 6, wherein the constriction of the elastic central part is slightly displaced from the symmetrical position.

8. A weighing device according to claim 6, wherein the bridge comprises a constrictional bending strip in the centre part, and two levers positioned symmetrically with respect to the bending strip.

9. A weighing device according to claim 8, wherein the two levers are generally T-shaped, opposed by the ends of their stems, the bars of the T being rectangular pieces cooperating to define the joints, while their stems define a great transverse rigidity at the same time as a slight torsional rigidity.

* * * * *